H. H. MERRIMAN.
CULTIVATOR.
APPLICATION FILED MAY 8, 1920.
1,402,521.
Patented Jan. 3, 1922.
2 SHEETS—SHEET 1.
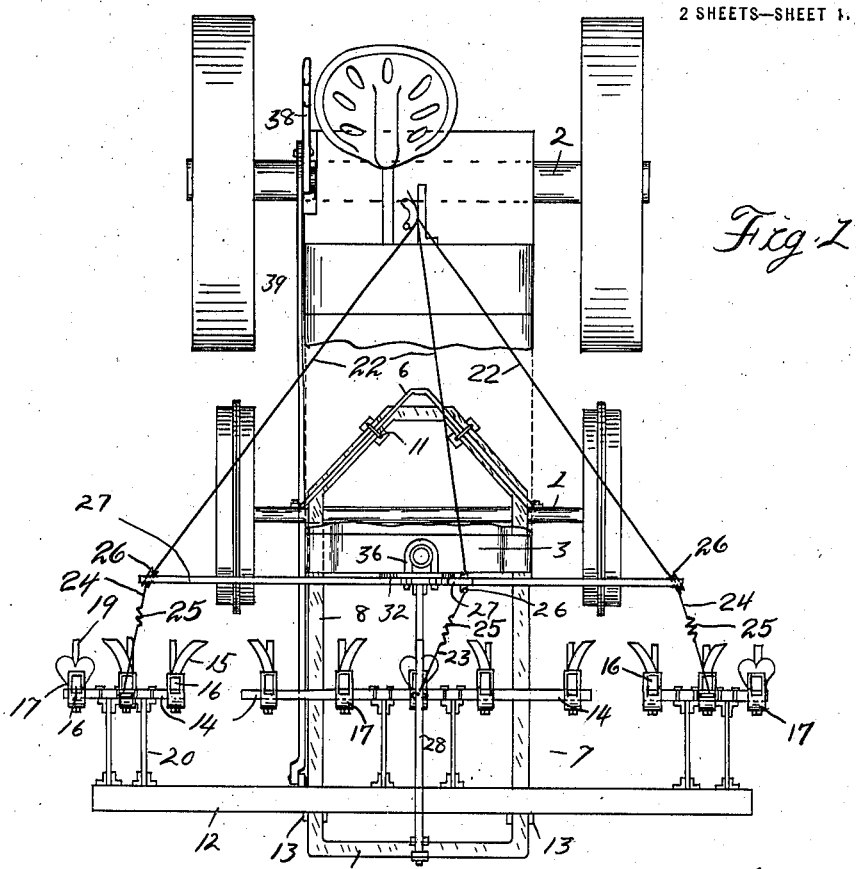
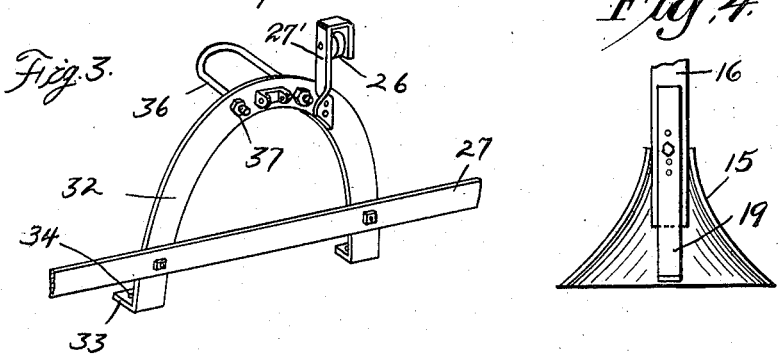
Inventor
Henry H. Merriman
By Whittemore Hulbert & Whittemore
Attorneys

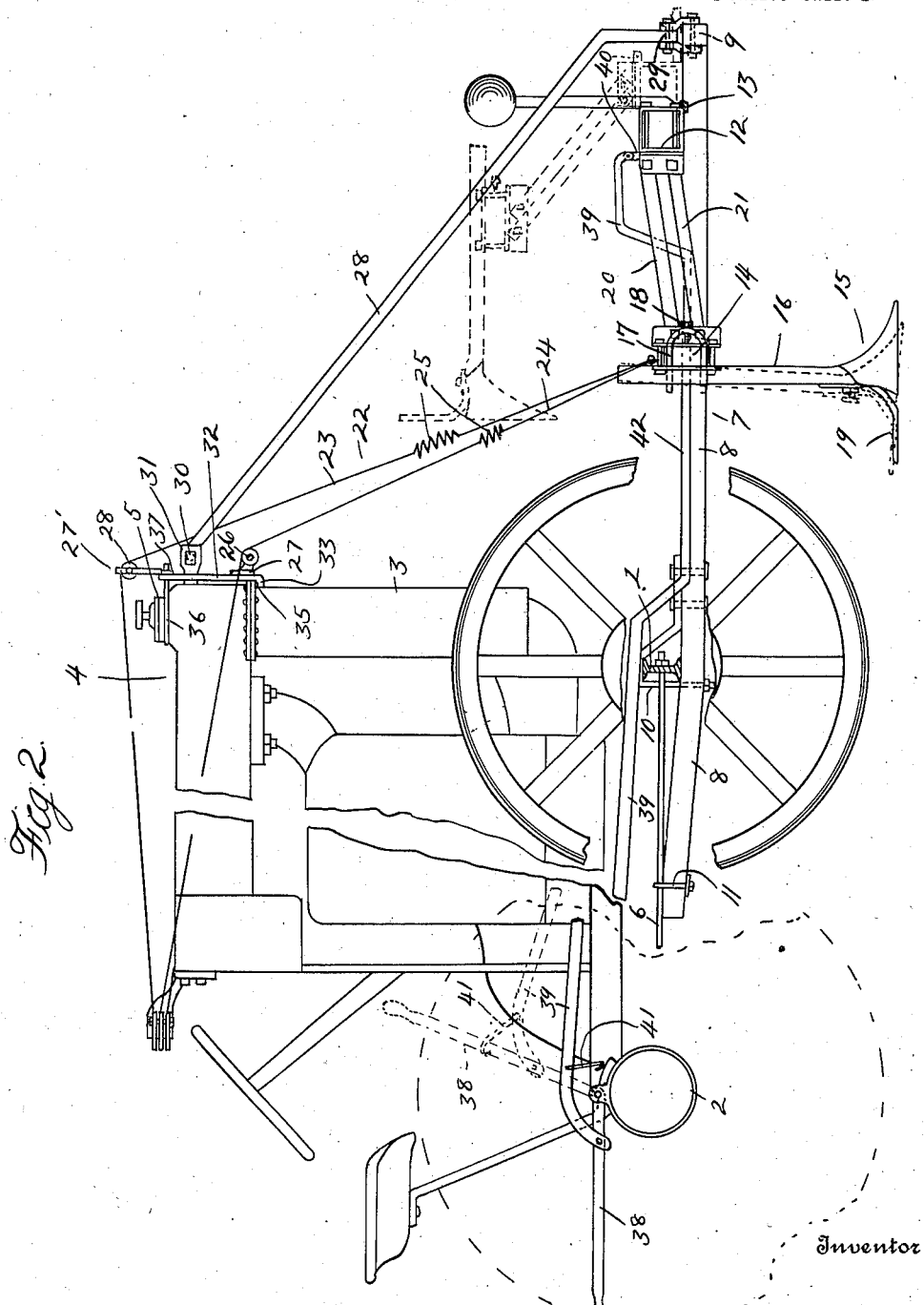

UNITED STATES PATENT OFFICE.

HENRY H. MERRIMAN, OF DECKERVILLE, MICHIGAN.

CULTIVATOR.

1,402,521.  Specification of Letters Patent.  Patented Jan. 3, 1922.

Application filed May 8, 1920. Serial No. 379,695.

*To all whom it may concern:*

Be it known that I, HENRY H. MERRIMAN, a citizen of the United States of America, residing at Deckerville, in the county of Sanilac and State of Michigan, have invented certain new and useful Improvements in Cultivators, of which the following is a specification, reference being had therein to the accompanying drawings.

The invention relates to cultivators and has for its object the provision of a unit which is attachable to a tractor without alteration of the latter. Another object is to mount the unit upon the tractor so that its cultivating tools will be forward of the tractor. A further object is the provision of means operable from the tractor driver's seat for raising and lowering the cultivating tools. The invention has for still other objects the novel arrangements and combinations of parts as more fully hereinafter set forth.

In the drawings:

Figure 1 is a top plan view of a construction embodying my invention, a portion thereof being broken away to show the cultivator frame;

Figure 2 is a side elevation thereof;

Figure 3 is a perspective view of a detail;

Figure 4 is a rear elevation of a cultivating tool and its depth control.

The tractor has the front axle 1, the rear drive axle 2, and the radiator comprising the air-cooling portion 3 and the cap portion 4 with the filler neck 5. 6 is a V-shaped brace rod or wish-bone having its apex secured to the tractor engine and its ends secured to the front axle 1.

7 is a V-shaped frame of the cultivator and having the side bars 8 extending transversely of and mounted upon the front axle 1 and the cross bar 9 extending between the forward ends of the side bars and located a substantial distance forward of the front axle. The side bars 8 extend immediately below the front axle and are secured thereto by means of the clips 10. The portions of these side bars to the rear of the front axle converge substantially at the same angle as the V-shaped brace rod or wishbone 6 and are secured thereto by the clips 11.

12 is a draw bar extending transversely of the side bars 8 near their forward ends and pivotally secured thereto as at 13. 14 are alined knife bars in rear of and parallel to the draw bar 12 and connected thereto. 15 are cultivating tools secured to the knife bars 14 by means of the uprights 16 passing through yokes 17 upon the knife bars and secured in these yokes by the set screws 18. To regulate the depth to which the cultivating tools extend into the ground, depth controls 19 adapted to rest upon the surface of the ground are adjustably secured to the uprights 16.

For the purpose of maintaining when the cultivating tools are in operative position the same angle of inclination of the cultivating tools to the ground regardless of the distance between the tools and the cultivator frame the connections between the draw bar 12 and the knife bars 14 comprise the parallel links 20 and 21 pivotally secured at their ends to the draw bar and knife bars.

In order to yieldably vary the downward pressure of the cultivating tools, the cable connections 22 are provided, secured to the knife bars 14 and extending back adjacent to the driver's seat of the tractor. These cable connections comprise cables 23 and 24 with the tension coil springs 25 between their adjacent ends. The cables 24 pass over pulleys 26 which are mounted upon bars 27 secured at the front of the radiator. As shown the bar 27 carrying the pulleys for the cable connections to the end knife bars, extends horizontally while the bar 27 carrying the pulley for the cable connection to the central knife bar extends upwardly.

28 is a rod pivotally connected at 29 to the center of the cross bar 9 and at 30 to the channel bar 31 secured to the front of the radiator cap 4, the arrangement being such that the forward end of the cultivator frame 7 is supported and at the same time this frame is permitted to remain in the same position relative to the front axle of the tractor. 32 is a yoke to which the channel bar 31 is secured. This yoke is of inverted U-shape and has the foot flanges 33 at its lower ends which are provided with suitable recesses 34 adapted to be engaged in by some of the heads 35 of the securing means between the cap 4 and air-cooling portion 3 of the radiator, these foot flanges extending under the outwardly extending flanges of the cap and air-cooling portion of the radiator. 36 is a strap encircling the filler neck 5 of the radiator and having its ends pass through the upper end of the yoke 32 and secured thereto as by the nuts 37. The pulley supporting bars 27 are preferably supported upon this yoke 32.

For the purpose of raising the cultivating tools away from the ground, there is a hand lever 38 pivotally mounted upon the housing of the rear drive axle 2 of the tractor and located adjacent to the driver's seat. This hand lever is pivotally connected to the forwardly extending rod 39 which extends under the central knife bar 14 and is pivotally connected at its forward end to the arm 40 secured to the draw bar 12. The arrangement is such that upon swinging the hand lever 38 forward the draw bar 12 will be rotated about its pivots 13 through the arm 40 and rod 39. The parallel bars 20 and 21 will engage each other after the draw bar has been rotated through a part of its movement and will then raise the knife bars 14 with the cultivating tools, so that the parts will assume the positions shown in dotted lines in Figure 2, when the hand lever has been moved to its forward position. When in this position the parts can be locked by means of the hook 41 upon the rod 39 and engaging the hand lever 38. When the cultivating tools are engaging the ground the parts are held in locked position by having the pivot of the hand lever 38 arranged above the line extending between the pivot connecting the hand lever 38 and rod 39 and the pivot connecting the rod 39 and arm 40.

From the above description it will be readily seen that I have provided a simple attachment which requires no alteration of the tractor. Also, the cultivating tools are located forward of the front axle and the steering wheels thereon so that the tools will have a greater turning movement than the front of the tractor. Another important point is that the individual knife bars can be separately raised through their respective cable connections to permit of getting rid of an obstruction, such as a stick or piece of sod. A further feature is the means for raising all the knife bars simultaneously from the driver's seat of the tractor.

An important consideration is that the rod 39 is flexible so that when in operation, if heavy soil is encountered, such as clay, the depth to which the cultivating tools extend into the ground is automatically maintained. Thus, as shown in Figure 2 upon striking the heavy soil the cultivating tools are moved rearwardly to the positions indicated in dotted lines, which is permitted by flexing the rod 39. In this position, the bottom surfaces of the tools are inclined relative to the ground to tend to make the same dig in deeper. This is permitted, due to the fact that the depth controls upon the cultivating tools are out of contact with the ground. Specifically, in the present construction, the flexibility of the rod 39 is secured by making the depressed portion 42 of spring steel.

What I claim as my invention is:

1. The combination with a tractor having a front axle and a radiator, of a cultivator frame extending forwardly of said tractor and secured to said axle, cultivating tools mounted upon said frame forward of said tractor, and means secured to said radiator and to said frame forward of said tractor for supporting the latter.

2. The combination with a tractor having a front axle and a raditor, of a frame secured to said front axle and extending forwardly thereof, and a rod secured to said radiator and pivotally connected to said frame near its longitudinal center.

3. The combination with a tractor, having a front axle, a brace rod for said front axle and a radiator, of a frame rigidly secured to said front axle and brace rod and extending forwardly of said front axle and a rod detachably secured to said radiator and pivotally connected to the forward end of said frame near its center.

4. The combination with a tractor, having front and rear axles of a frame rigidly secured to said front axle, a draw bar pivotally mounted upon said frame, cultivating teeth connected to said draw bar, and a hand lever rotatably mounted upon said rear axle, and connections between said hand lever, and draw bar for rotating the latter upon rotation of the former to move said cultivating teeth away from or toward the ground.

5. The combination with a tractor, of a frame secured to said tractor and extending forwardly thereof, a draw bar pivotally mounted upon said frame, a knife bar connected to said draw bar and in rear thereof, cultivating teeth secured to said knife bar, and a hand lever rotatably mounted upon the rear axle of said tractor and connected to said draw bar for rotating the latter upon rotation of the former to move said teeth away from or toward the ground.

6. The combination with a tractor of a cultivator frame secured to said tractor and extending forwardly thereof, a draw bar pivotally mounted upon said frame, knife bars, parallel links pivotally secured to said draw bars and knife bars, cultivating tools carried upon said knife bars and individual cable connections for said knife bars extending adjacent to the driver's seat and adapted to raise said knife bars independently of each other.

7. The combination with a tractor, of a cultivator frame mounted upon said tractor and extending forwardly thereof, a draw bar pivotally mounted upon said tractor frame, knife bars in rear of said draw bar and connected thereto, cultivating teeth carried by said knife bars, individual means for raising said knife bars independently of each other, and means for rotating said draw bar to raise said knife bars simultaneously.

8. The combination with a tractor, having a radiator air cooling portion and a cap with abutting outwardly extending securing flanges, and headed securing means passing through said flanges, said cap having a filler neck, of a frame mounted upon said tractor and extending forwardly thereof, a yoke at the front of said radiator cap and having inwardly extending recessed flanges, said recesses being engageable in by the heads of said securing means for the cap and air cooling portion, a strap encircling said filler neck and connected to the upper end of said yoke, a member upon said strap, and a supporting rod connected to the forward end of said frame near its center and to said member upon the strap.

9. The combination with a vehicle, of a cultivator frame secured thereto and extending forwardly thereof, a draw bar rotatably mounted upon said frame, knife bars connected to said draw bar, cultivating tools mounted upon said knife bars, and individual flexible connections for said knife bars extending adjacent to the driver's seat and adapted to raise said knife bars independently of each other.

10. The combination with a tractor, of an attachment, comprising a frame detachably secured to said tractor and extending forwardly thereof, a draw bar upon said frame, a knife bar, parallel links pivotally secured to said draw and knife bars, and a ground working implement carried upon said knife bar.

11. The combination with a motor vehicle, of a frame extending forwardly of said vehicle, a member rotatably mounted upon said frame, a ground working implement carried upon said rotatable member and adapted to re-act thereon to rotate the same, and yieldable means engaging said rotatable member to maintain the same in fixed position upon said frame.

12. The combination with a motor vehicle, of a frame extending forwardly of said vehicle, a draw bar extending transversely of and rotatably mounted upon said frame, a knife bar, parallel links pivotally secured to said draw bar and knife bar, a ground working implement carried upon said knife bar, and a manually adjustable rod connected to said draw bar for rotating the same, said rod having a resilient portion for yieldably maintaining said draw bar in its adjusted positions.

In testimony whereof I affix my signature.

HENRY H. MERRIMAN.